US008755636B2

(12) United States Patent
Zhang et al.

(10) Patent No.: US 8,755,636 B2
(45) Date of Patent: Jun. 17, 2014

(54) METHOD AND APPARATUS OF HIGH-RESOLUTION IMAGE RECONSTRUCTION BASED ON MULTI-FRAME LOW-RESOLUTION IMAGES

(75) Inventors: Xinfeng Zhang, Beijing (CN); Si-Wei Ma, Beijing (CN); Xun Guo, Beijing (CN); Shaw-Min Lei, Hsinchu (TW)

(73) Assignee: Mediatek Inc., Hsinchu (TW)

( * ) Notice: Subject to any disclaimer, the term of this patent is extended or adjusted under 35 U.S.C. 154(b) by 87 days.

(21) Appl. No.: 13/476,208

(22) Filed: May 21, 2012

(65) Prior Publication Data

US 2013/0064472 A1   Mar. 14, 2013

(30) Foreign Application Priority Data

Sep. 14, 2011   (CN) .......................... 2011 1 0270593

(51) Int. Cl.
*G06K 9/32*   (2006.01)

(52) U.S. Cl.
USPC ....................................... 382/294

(58) Field of Classification Search
None
See application file for complete search history.

(56) References Cited

U.S. PATENT DOCUMENTS

| 5,111,512 | A | * | 5/1992 | Fan et al. | 382/122 |
| 5,696,848 | A | * | 12/1997 | Patti et al. | 382/254 |
| 5,831,977 | A | * | 11/1998 | Dent | 370/335 |
| 2006/0018558 | A1 | * | 1/2006 | Kuniba | 382/232 |
| 2009/0172754 | A1 | * | 7/2009 | Furukawa | 725/91 |

OTHER PUBLICATIONS

Takeda et al., "Spatio-Temporal Video Interpolation Using Motion-Assisted Steering Kernel (MASK) Regression", Proceedings of IEEE International Conference on Image Processing, pp. 637-640, Oct. 12-15, 2008.*

* cited by examiner

*Primary Examiner* — Bhavesh Mehta
*Assistant Examiner* — Feng Niu
(74) *Attorney, Agent, or Firm* — Blairtech Solution LLC

(57) ABSTRACT

A method and apparatus for reconstructing a high-resolution image based on multiple low-resolution images are disclosed. The method and apparatus incorporating an embodiment according to the present invention reconstructs the high-resolution image based on a kernel regression method using a modified kernel function. The kernel function takes into consideration of registration reliability of regression residue and rotational motion within the multiple low-resolution images. The registration reliability adjusts weighting on the regression residues according to local gradient estimated between neighboring values. Furthermore, multi-scale regression residue is used to alleviate impact of noise.

14 Claims, 3 Drawing Sheets

METHOD AND APPARATUS OF HIGH-RESOLUTION IMAGE RECONSTRUCTION BASED ON MULTI-FRAME LOW-RESOLUTION IMAGES

CROSS REFERENCE TO RELATED APPLICATIONS

The present invention claims priority to Chinese Patent Application, No. 201110270593.X, filed Sep. 14, 2011, entitled "Multi-Frame Super-Resolution Methods for Video". The Chinese Patent Applications is hereby incorporated by reference in its entirety.

FIELD OF THE INVENTION

The present invention relates to image processing. In particular, the present invention relates to reconstruction of high-resolution image using multiple lower-resolution images.

BACKGROUND

In the field of digital image processing and display, often there is a need to display an image in high resolution based on a low-resolution image sources. For example, in the IPTV (Internet Protocol Television) application, the streaming video sources may be transmitted at a resolution much lower than the native resolution of a television set. In order to display the low-resolution streaming video contents on the television set, the source video has to be up converted to the full native resolution supported by the television set. Similar requirement of high-resolution image reconstruction has also been noted in digital camera, satellite remote sensing imaging, and medical imaging.

Various high-resolution image reconstruction techniques have been reported in the literature. One category of high-resolution image reconstruction techniques is based on a single low-resolution frame. Bilinear interpolation is one of the popular conventional approaches to high-resolution image reconstruction. Bilinear interpolation performs linear interpolation in both horizontal and vertical directions. The computation associated with bilinear interpolation is relatively simple and the visual quality of the interpolated image is usually acceptable. Nevertheless, the bilinear interpolation process often causes smoothness and other artifacts around object edges due to interpolation in the direction perpendicular to the edge. Accordingly, various modified interpolation techniques based on single frame have been reported in the literature to enhance sharpness around object edges. For example, an edge-directed interpolation is disclosed by Li, et al. ("New Edge-Directed Interpolation", in *IEEE TRANSACTIONS ON IMAGE PROCESSING*, pp. 1521-1527, VOL. 10, NO. 10, OCTOBER 2001) and the method is termed as NEDI in this disclosure. The NEDI method utilizes the edge-directed property of covariance-based adaptation instead of explicitly estimating the edge orientation. The NEDI method has been shown to produce improved quality over the bilinear interpolation method.

For more advanced high-resolution image reconstruction, signal processing techniques are used to generate the high-resolution image using multiple low-resolution images. The multi-frame based high-resolution image reconstruction is also referred to as super-resolution image reconstruction in the field. In this disclosure, super-resolution image reconstruction and high-resolution image reconstruction may be used interchangeably. The multiple images may contain moving objects in the scene and motion estimation has to be used to match corresponding pixels among different frames. The estimation of motion information is referred to as registration in the field. In typical multi-frame based high-resolution image reconstruction, three stages of processing are involved, as shown in FIG. 1, including registration 110, interpolation 120 and restoration 130. The stage of registration 110 receives multiple low-resolution images, $y_i$, i=1, ..., P. The outputs from registration 110 are motion-compensated low-resolution images. The stage of interpolation 120 reconstructs the high-resolution image on a high-resolution grid using the motion-compensated low-resolution images. There are various interpolation techniques used in the field. The stage of restoration 130 is used to reduce the noise and/or artifact introduced in the interpolation stage. An overview of super-resolution image reconstruction is described by Park et al. (Super-Resolution Image Reconstruction: A Technical Overview, *IEEE SIGNAL PROCESSING MAGAZINE*, pp. 21-36, May 2003).

Recently, kernel regression has been introduced by Takeda et al. ("Kernel Regression for Image Processing and Reconstruction", *IEEE TRANSACTIONS ON IMAGE PROCESSING*, pp. 349-366, VOL. 16, NO. 2, FEBRUARY 2007) for high-resolution image reconstruction. For 2-D kernel regression, a two-dimensional regression model is used to describe the observed data $y_i$ at location $x_i$:

$$y_i = f(x_i) + \epsilon_i, \ i=1, \ldots, P, \ x_i = (x_{1i}, x_{2i}), \qquad (1)$$

where $(x_{1i}, x_{2i})$ is the coordinate in the two dimensional space, $f(\cdot)$ is the regression function to be determined, and $\epsilon_i$ is an independent and identically distributed zero mean noise. P represents the number of low-resolution data samples in the region of interest used to construct a high-resolution sample. The specific form of $f(x_i)$ may be unspecified. However, it can be assumed that the regression function is locally smooth around location x where the high-resolution sample will be reconstructed. Accordingly, the regression function at location $x_i$ can be represented using a form of Taylor series:

$$f(x_i) = \beta_0 + \beta_1^T(x_i - x) + \beta_2^T \text{vech}\{(x_i - x)(x_i - x)^T\} + \ldots \qquad (2)$$

where $\beta_0 = f(x)$, $\beta_1$ and $\beta_2$ can be represented as:

$$\beta_1 = \nabla f(x) = \left[\frac{\partial f(x)}{\partial x_1}, \frac{\partial f(x)}{\partial x_2}\right]^T, \text{ and} \qquad (3a)$$

$$\beta_2 = \frac{1}{2}\left[\frac{\partial^2 f(x)}{\partial x_1^2}, \frac{\partial^2 f(x)}{\partial x_1 \partial x_2}, \frac{\partial^2 f(x)}{\partial x_2^2}\right]^T. \qquad (3b)$$

Term $\text{vech}(\cdot)$ is defined as the half-vectorization operator of the "lower-triangular" portion of a symmetric matrix, e.g., $$\text{vech}\begin{pmatrix} a & b & c \\ b & e & f \\ c & f & i \end{pmatrix} = [a \ b \ c \ e \ f \ i]^T. \qquad (4)$$

Base on equation (2), the regression function can be specified if all $\beta_n$'s are known. Accordingly, the high-resolution reconstruction problem for estimating the high-resolution construction at x based on observed data $y_i$, i=0, ..., P, can be solved by determining the coefficient set, $\{\beta_n\}$. One approach to determining the coefficient set of $\{\beta_n\}$ is to solve the following optimization problem:

$$\min_{\{\beta_n\}} \sum_{i=0}^{N} [y_i - \beta_0 - \beta_1^T(x_i - x) - \beta_2^T \text{vech}\{(x_i - x)(x_i - x)^T - \ldots\}]^2 K_H(x_i - x). \quad (5)$$

$K_H(\cdot)$ in equation (5) is the kernel function which penalizes distance away from the local position where the approximation is centered. The method of high-resolution reconstruction based on a regression model is termed as kernel regression.

To further improve the performance of high-resolution image reconstruction based on kernel regression, Takeda et al. disclosed data-adaptive kernel regression. Data-adapted kernel regression methods takes into consideration of the radiometric properties of these samples in addition to the sample location and density. Therefore, the effective size and shape of the regression kernel are adapted locally to image features such as edges. Takeda et al., incorporates a feature of kernel function associated with the measured data that implicitly measures a function of the local gradient estimated between neighboring values and to use this estimate to weight the respective measurements. Accordingly, a two-dimensional steering kernel function is introduced by Takeda et al. and the two-dimensional steering kernel function has a form shown below:

$$K_H(x_i - x) = \frac{\sqrt{\det(C_i)}}{2\pi} \exp\left\{-\frac{(x_i - x)^T C_i (x_i - x)}{2h}\right\}, \quad (6)$$

where a Gaussian kernel is used, h is the smoothing parameter to control the strength of the penalty, and $C_i$ is covariance matrices based on differences in the local gray-values at $x_i$.

The steering kernel in equation (6) takes into consideration of local data characteristics, such as edges. Takeda et al. have reported performance improvement over bilinear interpolation and classic kernel regression. Nevertheless, the steering kernel in (6) is agnostic of object motion within the multiple frames and consequently the performance may be compromised. In a subsequent work by Takeda et al., a three dimensional steering kernel ("Spatio-Temporal Video Interpolation Using Motion-Assisted Steering Kernel (MASK) Regression", *Proceedings of IEEE International Conference on Image Processing*, pp. 637-640, 12-15 Oct. 2008) is disclosed. The spatio-temporal three-dimensional kernel is termed as MASK by Takeda et al. The adaptive spatio-temporal steering kernel called motion-assisted steering kernel (MASK) is shown in equation (7):

$$K_{MASK} \equiv \frac{1}{\det(H_i^S)} K\big((H_i^S)^{-1} H_i^m (x_i - x)\big) K_{h_i^t}(t_i - t), \quad (7)$$

where $H_i^S$ is a 3×3 spatial steering matrix, $H_i^m$ is a 3×3 motion steering matrix, and $h_i^t$ is a temporal steering parameter. The MASK method addresses the motion factor by introducing 3×3 motion steering matrix, $H_i^m$. It is well known that the motion-compensated residues are usually more prominent in the area undergoing complex motion. The pixels from the areas undergoing complex motion may contribute significantly to the overall residue calculation during the optimization process. Nevertheless, the accuracy of registration for areas with complex motion is not taken into consideration in the MASK approach. Consequently, the performance of the MASK-based approach may suffer performance degradation when complex motion is involved in the multiple frames. In additional, the MASK method lacks the capability to handle rotational object motion in the multiple frames. Therefore, neither the two-dimensional kernel regression nor the three-dimensional based MASK method can adequately address complex motion in the multiple frames. It is desirable to develop super-resolution image construction that can deliver improved performance and handle complex motion in the multiple frames.

BRIEF SUMMARY OF THE INVENTION

A method and apparatus for reconstructing a high-resolution image based on multiple low-resolution images are disclosed. The method and apparatus incorporating an embodiment according to the present invention comprise receiving a plurality of low-resolution images; applying registration process to the plurality of low-resolution images, wherein motion information and registration residue are derived; determining a kernel function, wherein the kernel function is related to registration reliability, rotation information, or a combination of the registration reliability and the rotation information, wherein the registration reliability is derived from the registration residue, and wherein the rotation information is derived from the motion information; and reconstructing a value of the high-resolution image at a pixel using a kernel regression method incorporating the kernel function.

One aspect of the current invention addresses derivation of registration reliability from the registration residue. The registration residue can be weighted by a weighting factor and a smaller weighting factor is used for the registration residue having larger variance. The registration reliability may also be determined based on more than one registration residue within an area surrounding the pixel. In another embodiment according to the present invention, multi-scale registration residues can be used to derive the registration reliability. Furthermore, the registration reliability can be scaled according to average registration residue of a current low-resolution image. Another aspect of the current invention addresses derivation of the rotation information from the motion information. The rotation information can be represented by a rotation matrix and the rotation matrix is derived from an affine-transform model mapping a first pixel in a current low-resolution image to a second pixel in a reference low-resolution image according to the motion information. Furthermore, the rotation matrix can be determined from affine-transform matrix of the affine-transform model using Gram-Smhmidt orthonormalization

DETAILED DESCRIPTION OF THE INVENTION

As mentioned earlier, kernel regression is a powerful tool in high-resolution image reconstruction using multiple lower-resolution images. The kernel regression-based approach estimates the image data at locations corresponding to finer spatial resolution according to a regression model by determining parameters $\{\beta_n\}_{n=0}^N$ to minimize the residue errors. The 2D kernel regression method disclosed in the technical paper by Takeda et al. ("Kernel Regression for Image Processing and Reconstruction", *IEEE TRANSACTIONS ON IMAGE PROCESSING*, PP. 349-366, VOL. 16, NO. 2, FEBRUARY 2007) is extended to a 3D case, where an adaptive spatio-temporal steering kernel is introduced in the technical paper by Takeda et al. ("Spatio-Temporal Video Interpolation Using Motion-Assisted Steering Kernel (MASK) Regression", *Proceedings of IEEE International Conference on Image Processing*, pp. 637-640, 12-15 Oct. 2008). However, the MASK method incorporates a motion steering matrix, which is constructed on the basis of a local estimate of the motion by warping the kernel along the local motion trajectory. The motion steering kernel cannot adequately address complex motion, particularly around edges of moving objects. Accordingly, a rotation matrix is disclosed in the steering kernel according to an embodiment of the present invention to address complex motion in the multiple frames. The registration residue, i.e., motion prediction error, resulted from motion estimation is usually more prominent in areas involved with complex motion. The registration residue from these areas may inadvertently have too much influence on the high-resolution reconstruction. Accordingly, one aspect according to the present invention assigns weight to regression residue adaptively depending on characteristics of the residues so as to improve the system performance. In one embodiment according to the present invention, registration reliability is disclosed and used in the steering kernel to improve performance of super-resolution construction. In a high-resolution reconstruction system, the registration process often uses interpolation filter to derive data at sub-pixel locations, which may cause interpolation error. Study on the characteristics of registration residue indicates that large interpolation error often occurs in image area having large variations. Accordingly, in a system incorporating an embodiment according to the present invention, a registration efficiency model is disclosed that uses local variance of the image to adjust registration weighting so as to lower the impact of interpolation error and to improve the reliability of the registration efficient model.

Figure 1:
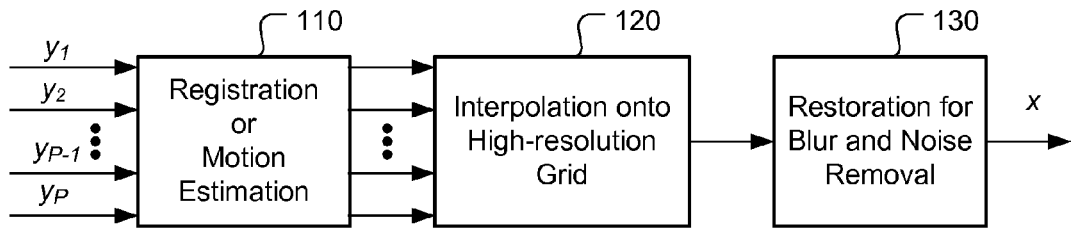
FIG. 1 illustrates typical stages involved in high-resolution reconstruction using multiple low-resolution images.
Figure 2:
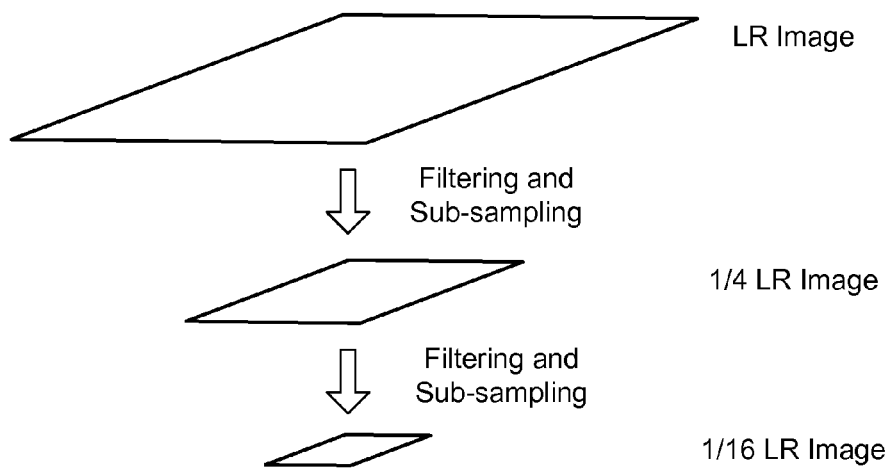
FIG. 2 illustrates an exemplary high-resolution reconstruction based on kernel regression incorporating an embodiment according to the present invention.

In typical images, the measured data always contain noise. In order to alleviate the impact of noise on high-resolution reconstruction, an embodiment according to the present invention uses multi-scale prediction error to improve the registration reliability. The reason why multi-scale prediction error is used rather than the original prediction error is that the coarser scales may better reflect the registration error. FIG. 2 illustrates an example of multi-scale image having three levels. Level-0 residue image corresponds to the original registration residue. Level-1 residue image is derived from level-0 residue image by applying a low-pass filter to the level-0 residue image and then applying decimation such as vertical 2:1 and horizontal 2:1 decimations. Level-2 residue image can be similarly derived from level-1 residue image.

In one embodiment according to the present invention, the kernel function is related to regression reliability $p(i_t,j_t)$ associated with each pixel at position (i,j) of the t-th image. The regression reliability associated with each pixel can be derived from the residues in an area around a pixel of interest using a weight function. For example, the regression reliability $p(i_t,j_t)$ based on regression residues in a $(2L \times 2L)$ window around pixel $(i_t,j_t)$ can be calculated:

$$p(i_t, j_t) = C_p \exp\left\{-\sum_{k=0}^{2}\sum_{m_t=-L}^{L}\sum_{n_t=-L}^{L} w_k(m_t, n_t) \times |r_k(i_t + m_t, j_t + n_t)|\right\} \quad (8)$$

where $C_p$ is a scaling factor, $r_k(i_t+m_t,j_t+n_t)$ is the level-k registration residue at $(i_t+m_t,j_t+n_t)$ and $w_k(m_t,n_t)$ is the weighting function for level-k registration residue at $(i_t+m_t,j_t+n_t)$. Term $r_0(i_t+m_t,j_t+n_t)$ is the unfiltered registration residue of the level-0 residue image at $(i_t+m_t,j_t+n_t)$. While the regression reliability $p(i_t,j_t)$ in (8) has a form of Gaussian function, other mathematical forms may be used. The weighted $|r_k(i_t+m_t,j_t+n_t)|$ in (8) is summed over a square window, and other window shapes, such as a rectangle or a circle, may also be used. A skilled person in the field may replace the absolute value of $r_k(i_t+m_t,j_t+n_t)$ with other functions, such as squared value of $r_k(i_t+m_t,j_t+n_t)$, to practice the present invention. The scaling factor may be dependent on the mean absolute value of registration residue in different scales, $T_t(i_t,j_t)$, for a frame at time t. For example, the scaling factor can be determined according to $$C_p = \frac{c_1}{1 + T_t(i_t, j_t)}, \quad (9)$$

where $c_1$ is a constant, and $T_t(i_t,j_t)$ is defined as $$T_t(i_t, j_t) = \frac{1}{N(2L+1)(2L+1)}\sum_{k=1}^{N}\sum_{m_t=-L}^{L}\sum_{n_t=-L}^{L} |r_k(i_t + m_t, j_t + n_t)|. \quad (10)$$

As shown in equation (9), a larger $T_t(i_t,j_t)$ will result in a smaller scaling factor $C_p$ and consequently result in smaller regression reliability. Equation (9) illustrates an example of determining scaling factor based on registration residue, where a smaller scaling factor is used for registration residue having larger values. A skilled person in the field may practice the present invention by using other mathematical forms to derive the scaling factor from registration residue.

Weight function $w(m_t,n_t)$ in (8), generally has a decreasing value with the distance from the underlying pixel. For example, a Gaussian function may be used:

$$w(m, n) = \exp\left(-\frac{\sqrt{m^2 + n^2}}{h_1}\right), \quad (11)$$

where $h_1$ is the smooth factor. Other functions having decreasing value with the distance may also be used. An embodiment according to the present invention will lower the weighting for pixel where registration residue, $r(i_t+m_t,j_t+n_t)$ has larger local variance u(i+m,j+n). Accordingly, variance value, $\sigma(i+m, j+n)$ may be used to adjust the weighting factor. For example, variance $\sigma(i+m,j+n)$ can be compared with a threshold $T_1$. If variance value, $\sigma(i+m,j+n)$ is smaller $T_1$, the weighting factor in equation (11) may be used. If the variance value, $\sigma(i+m,j+n)$ is greater than or equal to $T_1$, the weighting factor can be modified as:

$$w(m, n) = \frac{c_2}{1 + \sigma(i+m, j+n) - T_1}\exp\left(-\frac{\sqrt{m^2 + n^2}}{h_1}\right). \quad (12)$$

As shown in equation (12), the weighting factor, w(m, n) will become smaller when $\sigma(i+m,j+n)$ increases. In other words, the weighting factor will reduce the influence of registration residue on the registration reliability for the registration residue having larger variance. While an example of two forms of weighting factor are illustrated for two intervals of variance $\sigma(i+m,j+n)$, a skilled person may use more forms of weighting factors based on more intervals of variance $\sigma(i+m, j+n)$. For example, a second threshold $T_2 (T_2 > T_1)$ can be used to further divide the interval corresponding to $\sigma(i+m,j+n) > T_1$. Equation (11) will be used for $T1 \leq \sigma(i+m,j+n) < T_2$. For $\sigma(i+m,j+n) \geq T_2$, the weighting factor can be simplified as:

$$w(m,n) = C, \quad (13)$$

where C is a constant. The influence for registration residue having substantially large variance should be very small according to the present invention. Furthermore, the term $\exp(-\sqrt{m^2+n^2}/h_1)$ is always smaller than 1. Accordingly, the simplified weighting factor in equation (11) can be used for $\sigma(i+m,j+n) \geq T_2$. An embodiment according to the present invention includes the dependency of weighting factor on the local variance $\sigma(i+m,j+n)$ and the registration residue with larger variance has less influence on the weighting factor. The present invention is not limited to the number of intervals of variance $\sigma(i+m,j+n)$.

As mentioned before, high-resolution image reconstruction based on conventional 2D kernel regression does not take into consideration of the motion among multiple frames. On the other hand, super-resolution image reconstruction based on spatio-temporal (3D) kernel regression method disclosed by Takeda et al. treats the motion steering kernel using a warp model. In real-life video, the motion among picture frame often involves rotation. The warp model used by Takeda et al. cannot describe the motion adequately, particular around object edges. Accordingly, an embodiment according to the present invention takes into account of rotation in high-resolution image reconstruction. The effect of rotation between a reference picture and a current frame can be described using affine transform. Let $(x_{1i}{}^t, x_{2i}{}^t)$ be a pixel location in frame t and $(x_{1i}{}^{t_c}, x_{2i}{}^{t_c})$ be a corresponding pixel location after rotation in frame $t_c$. The corresponding $(x_{1i}{}^t, x_{2i}{}^t)$ and $(x_{1i}{}^{t_c}, x_{2i}{}^{t_c})$ locations can be described by an affine transform as follows, $$\begin{bmatrix} a_0 & a_1 \\ a_2 & a_3 \end{bmatrix} \times \begin{bmatrix} x_{1i}^t \\ x_{2i}^t \end{bmatrix} + \begin{bmatrix} a_4 \\ a_5 \end{bmatrix} \equiv A \times \begin{bmatrix} x_{1i}^t \\ x_{2i}^t \end{bmatrix} + \begin{bmatrix} a_4 \\ a_5 \end{bmatrix} = \begin{bmatrix} x_{1i}^{t_c} \\ x_{2i}^{t_c} \end{bmatrix}, \quad (14)$$

where A is the affine-transform matrix for pixel location i and $(\alpha_0, \alpha_1, \alpha_2, \alpha_3, \alpha_4, \text{ and } \alpha_5)$ can be derived using least square estimation. Furthermore, Gram-Smhmidt orthonormalization can be applied to the affine-transform matrix on the left side of the equation in (14) to change the affine-transform matrix on the left side into an identity matrix so as to derive the rotation matrix $R_i$. Accordingly, the steering kernel disclosed by Takeda et al. can be revised to take into account of rotation among picture frames and registration reliability, $$K_H(x_i - x) = p_i \frac{\sqrt{\det(C_i)}}{2\pi} \exp\left\{-\frac{(x_i - x)^T C_i R_i (x_i - x)}{2h}\right\}. \quad (15)$$

The steering kernel incorporating an embodiment according to the present invention includes the registration reliability p, described previously and the rotation matrix $R_i$. The steering kernel of (15) is expected to produce super-resolution images with better quality due to better motion handling by rotation model via affine transform and better system reliability by suppressing influence from pixels with complex motion as indicated by larger variance in registration residues.

Figure 3:
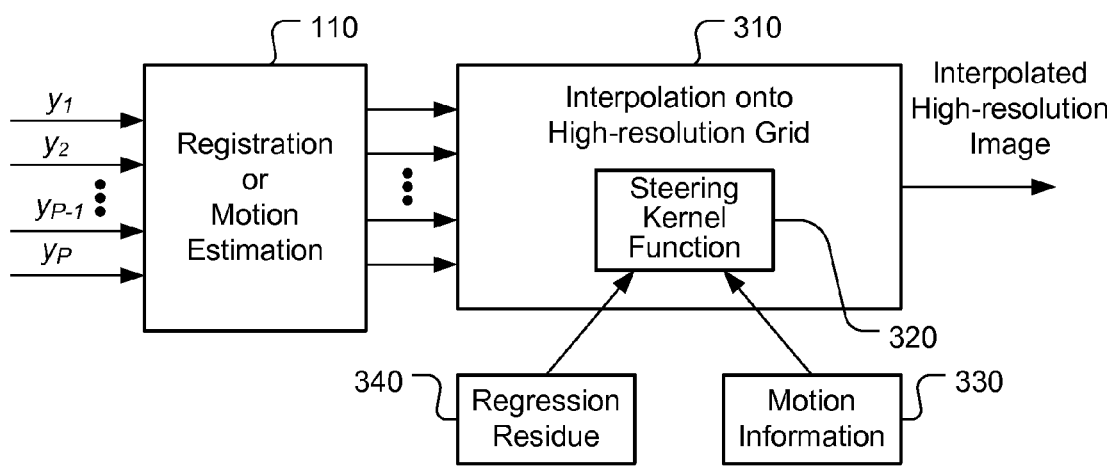
FIG. 3 illustrates an example of multi-scale image formation consisting of three levels for regression residues.

An exemplary super-resolution image reconstruction system incorporating an embodiment according to the present invention is shown in FIG. 3, where only the stages of registration and interpolation are shown. Any conventional restoration process, which is not shown in FIG. 3, can be used to implement the super-resolution image reconstruction system incorporating an embodiment according to the present invention. Interpolation process 310 receives motion-compensated low-resolution images from registration 110. Interpolation 310 is based on kernel regression method using a steering kernel function 320. Steering kernel function 320 receives inputs from regression residue 340 and motion information 330, where regression residue 340 is used to derive regression reliability and motion information 330 is used to derive rotation matrix as mentioned before. The output from the interpolation process may be further processed by the stage of restoration 130.

Figure 4:
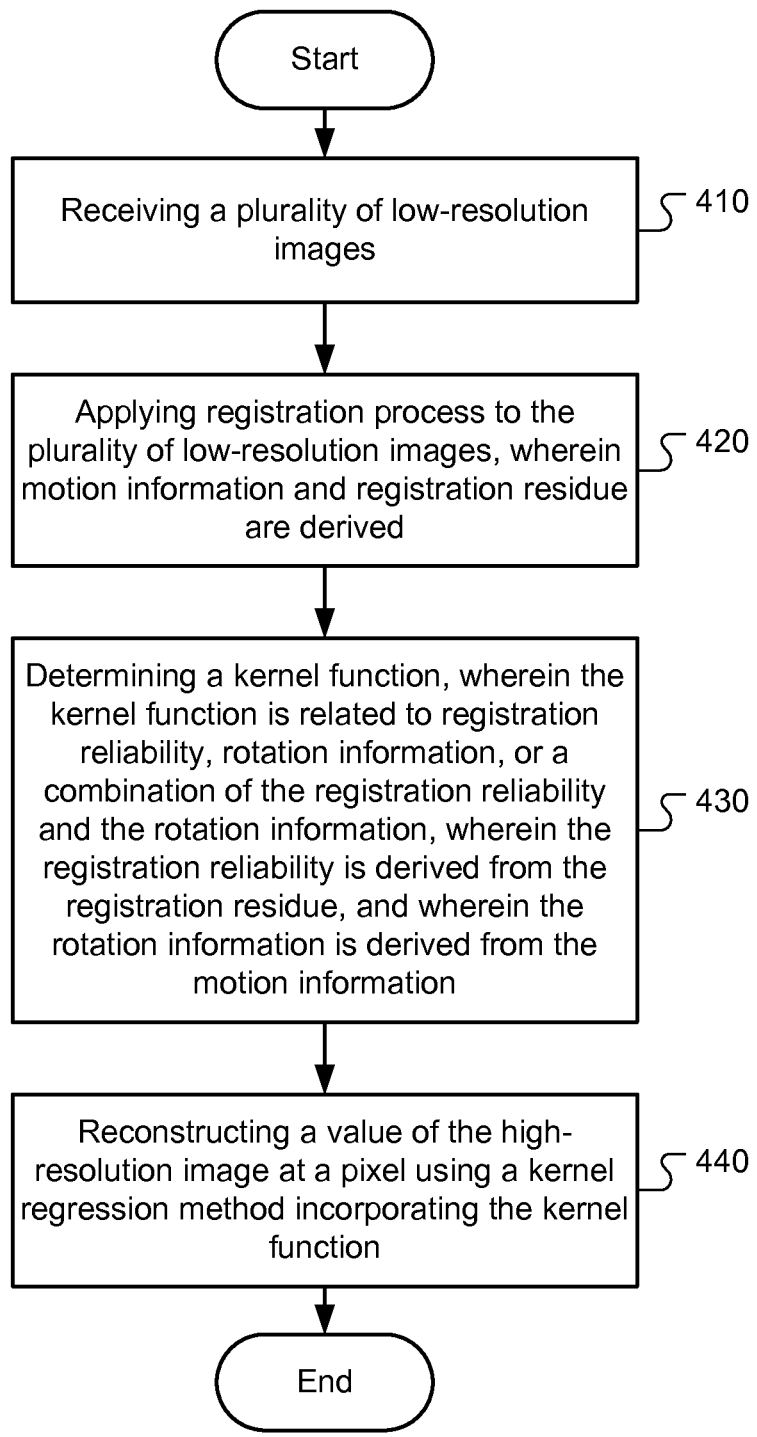
FIG. 4 illustrates an exemplary flow chart for high-resolution image reconstruction incorporating an embodiment according to the present invention.

An exemplary flow chart for high-resolution image reconstruction incorporating an embodiment according to the present invention is shown in FIG. 4. A plurality of low-resolution images is received at step 410. Registration process is then applied to the plurality of low-resolution images at step 420, wherein motion information and registration residue are derived. After registration process, the kernel function is determined in step 430. The kernel function is related to registration reliability, rotation information, or a combination of the registration reliability and the rotation information. The registration reliability is derived from the registration residue, and wherein the rotation information is derived from the motion information. After the kernel function is determined, the high-resolution image reconstructed can be performance using a kernel regression method incorporating the derived kernel function as shown in step 440.

To confirm the higher image qualify based on systems incorporating embodiments according to the present invention, the performance of the current system is compared with the performance for single frame-based bilinear interpolation and New Edge Directed Interpolation (NEDI) and multiple frame-based Maximum a Posteriori (MAP) and Motion-Assisted Steering Kernel Regression (MASK) methods. The performance in terms of Peak Signal to Noise Ratio (PSNR) for each system is calculated by executing computer codes implementing the steps associated with each system. For multiple frame-based systems, five frames are used and the PSNR is calculated for the third frame. In the first set of comparisons, images are up-converted from QCIF resolution (176×144 pixels) to CIF resolution (352×288 pixels) and the comparisons are based on test sequences names "City", "Harbour", "Tempete", "Bus", "Vetra", and "Crew". The lower resolution QCIF image are created from the original CIF image by applying 3×3 Gaussian filter followed by 2:1 vertical and horizontal decimations. The optical flow based motion estimation disclosed by Lucas and Kanade ("An iterative image registration technique with an application to stereo vision," in *Proceedings of Imaging Understanding Workshop*, pp. 121-130, 1981) is used for image registration. The results are illustrated in Table 1.

TABLE 1

| | | PSNR (dB) | | | | |
|---|---|---|---|---|---|---|
| Sequences | | Bilinear | NEDI | MAP | MASK | Current |
| QCIF->CIF | City | 26.978 | 28.211 | 28.458 | 30.918 | 31.103 |
| | Harbour | 23.076 | 24.745 | 25.633 | 27.206 | 27.358 |
| | Tempete | 24.316 | 25.717 | 26.480 | 27.268 | 27.556 |

TABLE 1-continued

| | PSNR (dB) | | | | |
|---|---|---|---|---|---|
| Sequences | Bilinear | NEDI | MAP | MASK | Current |
| Bus | 23.571 | 25.107 | 23.548 | 26.751 | 27.089 |
| Vertra | 26.015 | 28.075 | 26.620 | 28.225 | 29.071 |
| Crew | 30.888 | 32.796 | 32.226 | 32.758 | 35.221 |

A higher PSNR indicates a better quality. According to the results shown in Table 1, the currently disclosed system always achieves the best performance with noticeable improvement in PSNR. For the "Crew" sequence, the improvement in terms of PSNR for the currently disclosed system is substantial and the improvement is visually confirmed by examining the processed images.

TABLE 2

| | | PSNR (dB) | | | | |
|---|---|---|---|---|---|---|
| Sequences | | Bilinear | NEDI | MAP | MASK | Current |
| CIF->4CIF | Subway | 29.873 | 31.962 | 32.705 | 33.570 | 33.638 |
| | City | 26.717 | 27.499 | 28.504 | 30.749 | 31.284 |
| | Soccer | 27.832 | 29.406 | 29.277 | 31.150 | 31.448 |
| | Ice | 31.970 | 34.679 | 28.922 | 35.806 | 36.547 |
| | Crew | 31.571 | 33.962 | 30.780 | 31.125 | 35.291 |

In the second set of comparisons, images are up-converted from CIF resolution (352×288 pixels) to 4CIF resolution (704×576 pixels) and the comparisons are based on test sequences names "Subway", "City", "Soccer", "Ice", and "Crew". The results are illustrated in Table 2. Again, the lower resolution CIF image are created from the original 4CIF image by applying 3×3 Gaussian filter followed by 2:1 vertical and horizontal decimations. The optical flow based motion estimation disclosed by Lucas and Kanade is used for image registration. The currently disclosed system always achieves the best performance with noticeable improvement in PSNR. For the "Crew" sequence, the improvement in terms of PSNR for the currently disclosed system is substantial and the improvement is visually confirmed by examining the processed images.

Embodiment of the high-resolution image reconstruction according to the present invention as described above may be implemented in various hardware, software codes, or a combination of both. For example, an embodiment of the present invention can be a circuit integrated into a video compression chip or program codes integrated into video compression software to perform the processing described herein. An embodiment of the present invention may also be program codes to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware codes may be developed in different programming languages and different format or style. The software code may also be compiled for different target platform. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method of reconstructing a high-resolution image based on multiple low-resolution images, the method comprising:
receiving a plurality of low-resolution images;
applying registration process to the plurality of low-resolution images, wherein motion information and a registration residue are derived;
determining a kernel function, wherein the kernel function is related to registration reliability, rotation information, or a combination of the registration reliability and the rotation information, wherein the registration reliability is derived from the registration residue, and wherein the rotation information is derived from the motion information; and
reconstructing a value of the high-resolution image at a pixel using a kernel regression method incorporating the kernel function; and
wherein the registration residue is weighted by a weighting factor, and wherein a smaller weighting factor is used for the registration residue having larger variance.

2. The method of claim 1, wherein the registration reliability is determined based on more than one registration residue associated with one or more neighboring pixels surrounding the pixel.

3. The method of claim 1, wherein multi-scale registration residues are derived from the registration residue, and wherein the registration reliability is determined based on more than one multi-scale registration residues associated with one or more neighboring pixels surrounding the pixel.

4. The method of claim 1, wherein the registration reliability is scaled according to an average registration residue of a current low-resolution image.

5. The method of claim 1, wherein the rotation information is represented by a rotation matrix and the rotation matrix is derived from an affine-transform model mapping a first pixel in a current low-resolution image to a second pixel in a reference low-resolution image according to the motion information.

6. The method of claim 5, wherein the rotation matrix is determined from an affine-transform matrix of the affine-transform model using Gram Schmidt orthonormalization.

7. The method of claim 6, wherein the kernel function, $K_H(x_i-x)$ is represented by:

$$K_H(x_i - x) = p_i \frac{\sqrt{\det(C_i)}}{2\pi} \exp\left\{-\frac{(x_i - x)^T C_i R_i (x_i - x)}{2h}\right\},$$

wherein $p_i$ is the registration reliability, $R_i$ is the rotation matrix, $C_i$ is a covariance matrix based on differences in local gray-values at $X_i$, and x is a current pixel to be interpolated.

8. An apparatus for reconstructing a high-resolution image based on multiple low-resolution images, the apparatus comprising:
means for receiving a plurality of low-resolution images;

means for applying registration process to the plurality of low-resolution images, wherein motion information and a registration residue are derived;

means for determining a kernel function, wherein the kernel function is related to registration reliability, rotation information, or a combination of the registration reliability and the rotation information, wherein the registration reliability is derived from the registration residue, and wherein the rotation information is derived from the motion information; and means for reconstructing a value of the high-resolution image at a pixel using a kernel regression apparatus incorporating the kernel function; and wherein the registration residue is weighted by a weighting factor, and wherein a smaller weighting factor is used for the registration residue having larger variance.

9. The apparatus of claim 8, wherein the registration reliability is determined based on more than one registration residue associated with one or more neighboring pixels surrounding the pixel.

10. The apparatus of claim 8, wherein multi-scale registration residues are derived from the registration residue, and wherein the registration reliability is determined based on more than one multi-scale registration residues associated with one or more neighboring pixels surrounding the pixel.

11. The apparatus of claim 8, wherein the registration reliability is scaled according to an average registration residue of a current low-resolution image.

12. The apparatus of claim 8, wherein the rotation information is represented by a rotation matrix and the rotation matrix is derived from an affine-transform model mapping a first pixel in a current low-resolution image to a second pixel in a reference low-resolution image according to the motion information.

13. The apparatus of claim 12, wherein the rotation matrix is determined from an affine-transform matrix of the affine-transform model using Gram Schmidt orthonormalization.

14. The apparatus of claim 13, wherein the kernel function, $K_H(x_t-x)$ is represented by:

$$K_H(x_i - x) = p_i \frac{\sqrt{\det(C_i)}}{2\pi} \exp\left\{-\frac{(x_i - x)^T C_i R_i (x_i - x)}{2h}\right\},$$

wherein $p_i$ is the registration reliability, $R_i$ is the rotation matrix, $C_i$ is a covariance matrix based on differences in local gray-values at $X_i$, and x is a current pixel to be interpolated.

* * * * *